United States Patent Office

Re. 24,013
Reissued May 31, 1955

24,013

TITANIUM ALLOY

Robert I. Jaffee, Worthington, and Horace R. Ogden and Daniel J. Maykuth, Columbus, Ohio, assignors, by mesne assignments, to Rem-Cru Titanium, Inc., Midland, Pa., a corporation of Pennsylvania No Drawing. Original No. 2,575,962, dated November 20, 1951, Serial No. 187,822, September 30, 1950, Application for reissue October 21, 1952, Serial No. 316,103

6 Claims. (Cl. 75—175.5)

Matter enclosed in heavy brackets [ ] appears in the original patent but forms no part of this reissue specification; matter printed in italics indicates the additions made by reissue.

This invention relates to alloys of titanium, and contemplates certain high-strength ternary alloys comprised chiefly of titanium and including as alloying ingredients minor proportions of aluminum and iron.

The binary alloys of titanium and aluminum have been disclosed elsewhere. It is known that fractions of aluminum less than about 2.5% do not have a material strengthening effect on titanium, and that fractions over about 7.5% adversely effect ductility. The optimum combination of strength and ductility which can be secured in binary titanium alloys is satisfactory for many uses but barely meets the requirements of other uses.

The present invention comprises the discovery that the addition of certain fractions of iron to titanium-aluminum alloys produces a substantial increase in strength while maintaining acceptable ductility. These properties have been found in alloys containing from 2.5% to 7.5% aluminum and from 1% to 5% iron. They may be prepared from either commercial titanium or high purity titanium. However, when the commercial product is used its content of such contaminants as nitrogen, oxygen and carbon must be relatively low. This is particularly true of nitrogen. A nitrogen content greater than about 0.5% causes embrittlement. Oxygen can be tolerated, and is actually beneficial up to an amount of at least 0.1%. The presence of some carbon is beneficial, but the carbon content should not exceed about 0.3%.

In alloys of this group, the best combination of strength and ductility is developed when the alloys are annealed at a temperature which is within the alpha-beta field, and preferably relatively high in this field, say 850° C., and are slowly cooled from the annealing temperature. A typical metallographic structure is one of equiaxed alpha grains and intergranular beta. Iron being a beta stabilizer, the beta content tends to increase with the iron content. Some carbides may be present, carbon being soluble in alpha titanium to an amount of at least 0.25%, but less soluble in beta titanium. Quenching from such a temperature as 850° C., or higher, increases the proportion of the beta constituent, and tends to cause brittleness. Subsequent aging tends to precipitate small particles of the alpha phase from the beta phase, with an increase in hardness and further loss of ductility.

Typical of the alloys of this invention is one containing 5% aluminum, 2.5% iron, and 0.25% carbon. When slow cooled, after annealing about 3½ hours at a temperature of 850° C., the alloy has a proportional limit of 110,000 p. s. i., a 0.2% offset yield strength of 133,000 p. s. i., an ultimate strength of 150,000 p. s. i., an elongation in 1" of 11%, a bend radius of 1.2 times its thickness, and a surface hardness of 399 Vickers. An alloy of the same composition but with the addition of 0.1% oxygen, under the same conditions, has a proportional limit of 131,000 p. s. i., a 0.2% offset yield strength of 146,000 p. s. i., an ultimate strength of 155,000 p. s. i., an elongation in 1" of 10%, a bend radius 2.5 T, surface hardness of 424. An alloy containing 5% aluminum and 1% iron, after annealing at 850° C., has a proportional limit of 72,400 p. s. i., a 0.2% offset yield strength of 81,000 p. s. i., an ultimate strength of 97,500 p. s. i., an elongation in 1" of 17%, and a surface hardness of 306. The addition to this alloy of 0.25% carbon increases the proportional limit to 114,000 p. s. i., the 0.2% offset yield strength to 119,000 p. s. i., the ultimate strength to 128,000 p. s. i., and the surface hardness to 356; elongation remaining unchanged.

A binary alloy of titanium with 5% aluminum has a proportional limit of 43,000 p. s. i., a 0.2% offset yield strentgh of 63,000 p. s. i., and an ultimate strength of 79,000 p. s. i. It is thus seen that the addition of iron produces a substantial increase in strength with a ductility adequate for a wide variety of structural uses.

What is claimed is:

1. An alloy consisting essentially of from 2.5% to 7.5% aluminum, from 1% to 5% iron, from 0.01% to 0.30% carbon, balance titanium.

2. An alloy consisting essentially of from 2.5% to 7.5% aluminum, from 1% to 5% iron, from 0.01% to 0.30% carbon, not over 0.05% nitrogen, balance titanium.

3. An alloy consisting essentially of 5% aluminum, 1% to 5% iron, 0.01% to 0.30% carbon, balance titanium.

4. An alloy consisting essentially of 5% aluminum, 2.5% iron, 0.25% carbon, balance titanium.

*5. A titanium base alloy containing from 2.5–7.5% aluminum and from 1–5% iron, up to 0.3% carbon, up to 0.1% oxygen and up to 0.5% nitrogen; the balance of the alloy being substantially titanium and said alloy being characterized in having a tensile strength at least 97,000 p. s. i. and a tensile elongation of at least 10%.*

*6. A titanium base alloy having in the annealed condition a tensile strength of at least 97,000 p. s. i. and a tensile elongation of at least 10%, and containing: from 2.5%–7.5% aluminum and from 1%–5% iron, the balance of the alloy being substantially titanium.*

References Cited in the file of this patent or the original patent

FOREIGN PATENTS 718,822 Germany ---------- Mar. 24, 1942